(12) United States Patent
Hanna

(10) Patent No.: US 6,880,490 B2
(45) Date of Patent: Apr. 19, 2005

(54) DOG COLLAR HAVING BUCKLE

(75) Inventor: Tom Hanna, Wichita, KS (US)

(73) Assignee: Rose America, Inc., Wichita, KS (US)

( * ) Notice: Subject to any disclaimer, the term of this patent is extended or adjusted under 35 U.S.C. 154(b) by 9 days.

(21) Appl. No.: 10/619,481

(22) Filed: Jul. 16, 2003

(65) Prior Publication Data

US 2005/0011474 A1 Jan. 20, 2005

(51) Int. Cl.[7] .............................................. A01K 27/00
(52) U.S. Cl. .......................... 119/863; 24/180; 24/188
(58) Field of Search ........................ 119/792, 793, 769, 119/856, 863; 54/19.01, 19.3, 19.1; 2/321, 2/322; 24/164, 172, 178, 180, 182, 188

(56) References Cited

U.S. PATENT DOCUMENTS

| 694,379 A | * | 3/1902 | Hart ............................ 24/178 |
| 2,342,304 A | * | 2/1944 | Schreiber ..................... 24/178 |
| 4,224,901 A | * | 9/1980 | Carey, Jr. .................... 119/654 |
| 4,321,891 A | * | 3/1982 | Moeller ....................... 119/863 |
| 4,491,090 A | * | 1/1985 | Almeida ...................... 119/863 |
| 4,621,591 A | * | 11/1986 | Anderson et al. ........... 119/831 |
| 4,741,288 A | * | 5/1988 | Anderson et al. ........... 119/831 |
| 4,993,215 A | * | 2/1991 | Schutte ........................ 54/19.3 |
| 5,099,799 A | * | 3/1992 | Giacobbe .................... 119/793 |
| 5,297,514 A | * | 3/1994 | Stout et al. .................. 119/863 |
| 5,701,849 A | * | 12/1997 | Suchowski et al. ......... 119/865 |
| 5,785,010 A | * | 7/1998 | Koch ........................... 119/863 |
| 6,513,460 B1 | * | 2/2003 | Fountoulakis ............... 119/770 |

* cited by examiner

Primary Examiner—Robert P. Swiatek
(74) Attorney, Agent, or Firm—Shoemaker and Mattare

(57) ABSTRACT

A dog collar has non-adjustable buckle which permits one to remove the collar from a dog, and provides an attractive appearance. Adjustment of the length of the collar is accomplished by means of a separate adjuster.

10 Claims, 1 Drawing Sheet

DOG COLLAR HAVING BUCKLE

BACKGROUND OF THE INVENTION

This invention relates to a dog collar having a belt-type buckle.

Modern dog collars have snap-type connectors at their ends, which allow one quickly to install or remove the collar. These connectors are not particularly attractive, and may have, or appear to have, inadequate strength and security in some situations.

It would be desirable to provide dog owners with the alternative choice of a collar having an attractive metal buckle, without making the buckle also function as a length adjuster. This way, there would be no dangling free end of material at the buckle, when the collar was adjusted to shorter lengths; the buckle would in every case present a tidy appearance.

SUMMARY OF THE INVENTION

An object of the invention is to provide a dog collar with a secure metal buckle which can be unfastened to remove the collar from the dog.

Another object is to improve the appearance of a dog collar.

These and other objects are attained by a dog collar having a non-adjustable belt-type buckle, as described below.

BRIEF DESCRIPTION OF THE DRAWINGS

In the accompanying drawings.

DESCRIPTION OF THE PREFERRED EMBODIMENT

Figure 1:
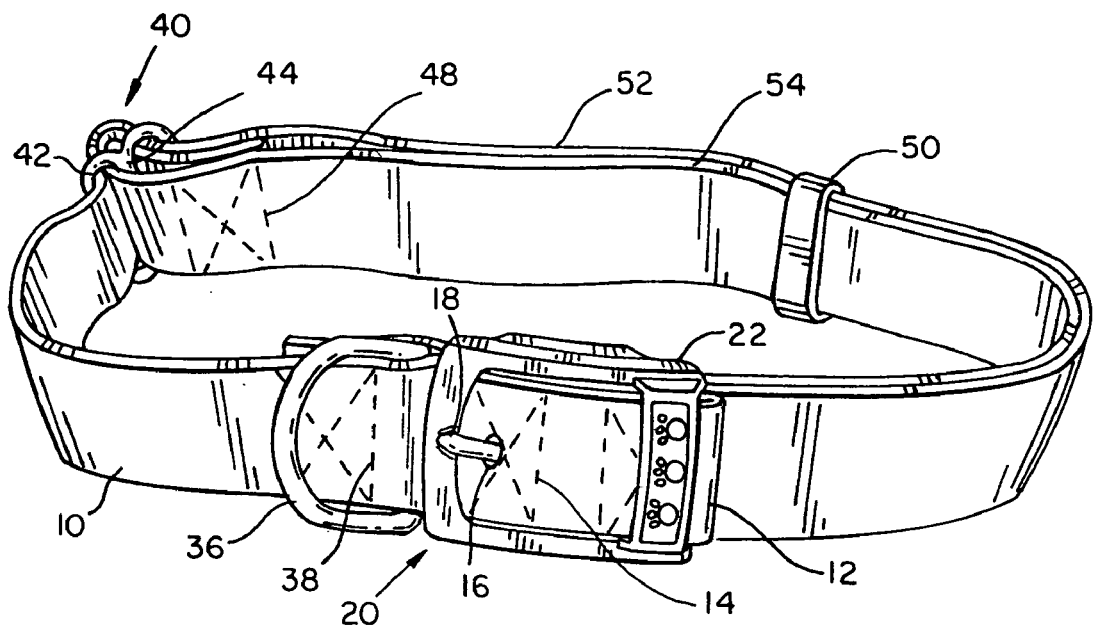
FIG. 1 is a perspective view of a dog collar having buckle embodying the invention.
Figure 2:
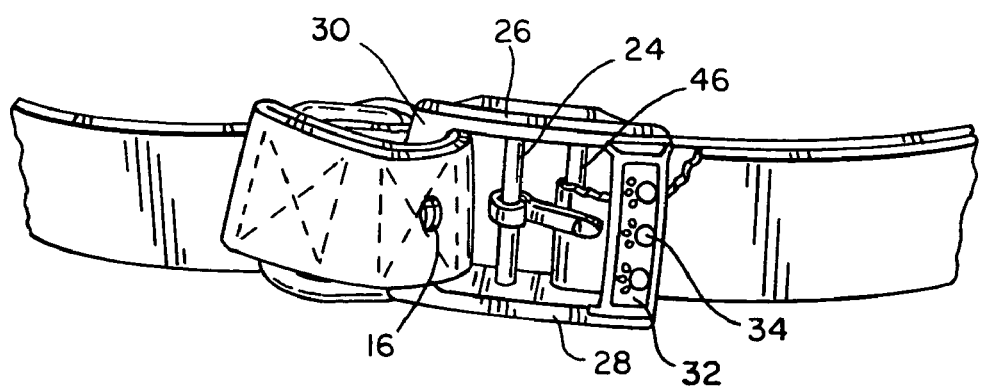
FIG. 2 is a similar view of the collar, with a portion removed, showing the buckle of the collar unfastened.

A dog collar embodying the invention, as shown in FIGS. 1 and 2, includes a strip 10 of a flexible material, which may be of any strong, durable, flexible material, most preferably a strong nylon fabric. Other materials such as leather may be appropriate alternatives.

The strip 10 has a first end 12 which is preferably doubled over a short distance; the overlap is maintained by stitching 14. A single hole 16 is punched through the doubled-over first end 12, to receive the pawl 18 of a metal buckle 20, which includes a frame 22 with a first crossbar 24 extending between the top and bottom sides 26, 28 of the frame. Lateral sides 30, 32 interconnect the top and bottom sides. The first crossbar loosely supports the pawl, which has sufficient length to engage one of the lateral sides. A trademark or logo, such as that shown at 34 in the drawings, may be applied to or formed on the buckle.

Adjacent the buckle, the straight segment of a D-ring 36 (for attaching a leash, tags, etc.) is retained between the overlapped layers of the first end by stitching 38 on either side of the straight segment.

The second end of the strip 10 is passed through a length adjuster 40 having two apertures 42 separated by a center post 44, then around a second crossbar 46 on the buckle, and back around the center post of the adjuster. The end of the strip is then secured by stitching 48 to the portion of the strip it overlaps, securing the center post. The length of the collar can be adjusted, as is commonly known, by relieving tension in the strip, and then moving the adjuster along the strip. A fabric band 50 may be applied to the collar before or after assembly to keep the unattached overlapped portions 52, 54 of the strip aligned.

The second crossbar is preferably offset rearward from the first crossbar, and the top and bottom sides of the buckle have increased depth, at least near their centers, to accommodate the offset and to strengthen the buckle.

It should be noted that the buckle is not adjustable, as it has only one hole. Any adjustment is achieved by moving the adjuster. The functions of the buckle are to enable one to remove the collar from the dog, and to provide an attractive appearance.

Since the invention is subject to modifications and variations, it is intended that the foregoing description and the accompanying drawings shall be interpreted as only illustrative of the invention defined by the following claims.

I claim:

1. A dog collar comprising
   a strip of flexible material having first and second ends,
   a buckle comprising a frame having two lateral sides, top and bottom sides interconnecting the lateral sides and two crossbars extending between the top and bottom sides, and a pawl mounted for pivoting movement on a first of said crossbars, the pawl having a length sufficient to engage one of said lateral sides,
   a first of said ends of the strip having only a single hole formed therein for receiving the pawl,
   a second of said ends of the strip being passed around a second of said cross bars and back along itself to form an overlapped portion, and being secured by an adjustment mechanism to an intermediate portion of the strip.

2. The dog collar of claim 1, wherein only a single hole is formed in the strip for receiving the pawl.

3. The dog collar of claim 1, wherein the first end of the strip is doubled and sewn together in the vicinity of the hole.

4. The dog collar of claim 1, wherein the strip of material is a nylon fabric.

5. The dog collar of claim 1, wherein the buckle is made entirely of metal.

6. The dog collar of claim 1, further comprising a D-ring retained by stitching between overlapped layers of the strip.

7. The dog collar of claim 6, wherein the first end of the strip is doubled and sewn together in the vicinity of the hole and the D-ring is retained by stitching on either side of a straight segment of the D-ring.

8. The dog collar of claim 1, wherein the adjustment mechanism is independent of the buckle.

9. The dog collar of claim 8, wherein the adjustment mechanism comprises a unitary metal body having two apertures separated by a center post, and the second end of the strip is secured to the center post by connecting a doubled portion of the second end of the strip with stitching confining the center post between said layers.

10. The dog collar of claim 1, further comprising a band of material extending around said overlapped portions to maintain them in alignment with one another.

* * * * *